US012768516B1

(12) United States Patent
Jiang et al.

(10) Patent No.: US 12,768,516 B1
(45) Date of Patent: Oct. 20, 2026

(54) LIGHT FIXTURE WITH AUTOMATIC LENS RETRACTION BASED ON SIGNAL MONITORING OF MASTER CONTROLLER

(71) Applicant: Guangzhou Haoyang Electronic Co., Ltd., Guangzhou (CN)

(72) Inventors: Weikai Jiang, Guangzhou (CN); Bin Deng, Guangzhou (CN); Zhi Liu, Guangzhou (CN); Xiran Zheng, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 19/286,698

(22) Filed: Jul. 31, 2025

(30) Foreign Application Priority Data

Apr. 30, 2025 (CN) ........................ 202520854840.8

(51) Int. Cl.
*F21V 14/06* (2006.01)

(52) U.S. Cl.
CPC .................................. *F21V 14/06* (2013.01)

(58) Field of Classification Search
CPC ......... F21V 14/06; F21V 14/065; F21V 15/00
See application file for complete search history.

(56) References Cited

U.S. PATENT DOCUMENTS

| | | | | |
|---|---|---|---|---|
| 7,766,520 | B2 * | 8/2010 | Bornhorst | F21V 14/06 362/426 |
| 10,508,792 | B1 * | 12/2019 | Chen | F21V 9/40 |
| 2019/0132055 | A1 * | 5/2019 | Deixler | H04B 10/116 |
| 2021/0329768 | A1 * | 10/2021 | Johnson | H05B 47/165 |
| 2024/0194064 | A1 * | 6/2024 | Kovalovsky | H05B 47/19 |

* cited by examiner

*Primary Examiner* — Thomas M Sember
(74) *Attorney, Agent, or Firm* — MUNCY, GEISSLER, OLDS & LOWE, P.C.

(57) ABSTRACT

A light fixture includes a master MCU module, a slave MCU module in communication connection with the master MCU module, a driving module controlled by the slave MCU module, a motor controlled by the driving module and configured to drive a light-emitting lens to extend out of or retract into the light fixture, a power supply module supplying power to the master MCU module, the slave MCU module and the driving module during normal operation of the light fixture, and an energy storage module supplying power to the slave MCU module when the power supply module is activated, the energy storage module being charged by the power supply module. The slave MCU module is further configured to control the motor to drive the light-emitting lens to retract into the light fixture, when a signal from the master MCU module has not received within a predetermined time.

20 Claims, 5 Drawing Sheets

LIGHT FIXTURE WITH AUTOMATIC LENS RETRACTION BASED ON SIGNAL MONITORING OF MASTER CONTROLLER

CROSS REFERENCE TO RELATED APPLICATIONS

The present application claims priority from Chinese Application No. CN 202520854840.8 filed on Apr. 30, 2025, all of which are hereby incorporated herein by reference.

TECHNICAL FIELD

The present disclosure relates to the technical field of stage light fixtures, and in particular to a light fixture with automatic lens retraction based on signal monitoring of a master controller and a method for automatically retracting the lens of the light fixture.

BACKGROUND

In the stage light fixtures, the shape of a light spot is usually adjusted by moving a light-emitting lens in a direction away from or towards a light source. However, enough moving space provided for the movement of the lens entirely within the light fixture would cause relatively large in size. For compact stage light fixture, due to the limited internal space thereof, for example, the light-emitting lens is designed to partially extend out of a light outlet during operation. Such configuration issue a further problem that when the light fixture is powered off, if the lens remains in the extension position, the exposed lens is highly vulnerable to external impact during transportation or carrying, resulting in structural damage such as lens breakage or deformation of a focusing mechanism, which could directly affect the reliability and service life of the light fixture.

In order to address this problem, before the light fixture is powered off, a driving component is controlled by an operator to retract the light-emitting lens into the light outlet. However, such may would have low working efficiency in the case of a large number of light fixtures. In addition, lens would not be retracted in the case of unexpected power failure.

It is therefore desirable to provide a design that enables the light-emitting lens to trigger automatic reset upon power failure, without relying on external protection or manual intervention, which can effectively reduce transportation risk as well as maintaining the advantages of the compact light fixtures.

SUMMARY

An object of the present disclosure is to provide a light fixture with automatic lens retraction based on signal monitoring of a master controller and a method for automatically retracting the lens of the light fixture, in which a slave MCU module is used to detect a working state of the light fixture and control the light-emitting lens to automatically retract into the light fixture when a power-off condition of the light fixture is detected.

The light fixture of the present disclosure includes a master MCU module; a slave MCU module in communication connection with the master MCU module; a driving module controlled by the slave MCU module; a motor controlled by the driving module and configured to drive a light-emitting lens of the light fixture to extend out of or retract into the light fixture; a power supply module electrically connected to the master MCU module, the slave MCU module and the driving module for power supply during normal operation of the light fixture; and an energy storage module supplying power to the slave MCU module when the power supply module is inactivated, the energy storage module being charged by the power supply module, where the slave MCU module is further configured to control the motor to drive the light-emitting lens to retract into the light fixture, when the slave MCU module has awaited a signal from the master MCU module for more than a predetermined time.

According to the present disclosure, when the light fixture is powered on and in normal operation, the power supply module simultaneously supplies power to the master MCU module, the slave MCU module and the driving module. The master MCU module forwards a control signal through the slave MCU module to indirectly control the driving module when the light fixture is in normal operation, the driving module thus in turn drives the motor to extend or retract the light-emitting lens according to an instruction for generating the control signal. The master MCU module also periodically sends a signal indicating its own power-on state to the slave MCU module. In the present disclosure, when the power supply module is inactivated, the master MCU module stops working, and the slave MCU module is powered by the energy storage module. If the slave MCU module does not receive the signal from the master MCU module within a predetermined time, it is determined that the light fixture is powered off, and the motor is immediately controlled by the driving module to retract the light-emitting lens into the light fixture. In addition, the master MCU module and the slave MCU module work collaboratively through communication connection in the present disclosure, which enables sensitive detection of the real working state of the light fixture, and quickly triggers a protection action on the light-emitting lens. This avoids damage to the light-emitting lens caused by exposure during transportation. The light fixtures on the market usually choose to be powered by a battery or an alternating current, however, the present disclosure eliminates the need to replace a module based on power types for detecting the power-on state of the light fixture, which thus is a simpler and more reliable way with compatibility.

In order to prevent the energy storage module from supplying power to the master MCU module and the power supply module when the power supply module is powered off, an anti-reverse module may be provided between the power supply module and the energy storage module, especially the power supply module may be electrically connected with the energy storage module, the slave MCU module and the driving module through the anti-reverse module. Such configuration can effectively save electric energy, and also prevent the master MCU module from sending a false signal because of receiving electric energy from the energy storage module, which effectively ensures determination accuracy of the slave MCU module.

With the characteristic of unidirectional conduction, the diode module can effectively block a reverse current. In addition, the diode module has a simple structure and is suitable for most circuit structures. The anti-reverse module in the present disclosure may be a diode module.

The communication connection constructed by the CAN bus module usually provides excellent real-time performance, reliability and expansibility, which is suitable for the smart lighting control system requiring high reliability and multi-node coordination. Therefore, the master MCU module and the slave MCU module may be in communication connection via a CAN bus module.

Alternatively, the master MCU module and the slave MCU module may be in communication connection via an RS485 bus module. The RS485 bus module can convert a serial signal sent by the master MCU module into a differential signal for transmission. This transmission mode offers strong anti-interference capability, making it more suitable for light fixtures with complex electromagnetic conditions.

In particular, the RS485 bus module may include two RS485 interface chips. The master MCU module is connected with a receiving pin, an output pin and an enable pin of one of the RS485 interface chips, the slave MCU module is connected to a receiving pin, an output pin and an enable pin of the other RS485 interface chip, and the two RS485 interface chips are connected through respective differential positive terminal pins and differential negative terminal pins correspondingly. In such configuration, the serial signal sent by the master MCU module is converted into the differential signal for transmission, and then finally converted into the serial signal and transmitted to the slave MCU module. In the process of signal transmission, the differential signal is more stable than the serial signal.

The capacitor enables temporary energy storage, and offers faster response, smaller size and higher reliability compared to a battery, which is safer as well. According to the present disclosure, the energy storage module may include at least one energy storage capacitor for storing energy.

To consume redundant electric energy in the energy storage capacitor when the light-emitting lens has retracted into the light fixture, the energy storage capacitor in the present disclosure may be connected in parallel with at least one energy-consuming resistor.

Additionally or alternatively, the energy storage module may further include an anti-surge resistor, where a current of the power supply module entering the energy storage module is grounded after sequentially passing through the anti-surge resistor and the energy storage capacitor. The anti-surge resistor is provided to limit a transient high current or voltage spike in the circuit to achieve a "soft start" of the circuit.

Furthermore, the energy storage module may further include a fuse arranged between the power supply module and the anti-surge resistor, where the anti-surge resistor and/or the energy storage capacitor are connected in parallel with an anti-reverse connection diode to prevent a reverse connection between the energy storage module and the power supply module. When the connection between the power supply module and the anti-surge resistor is correct, the current bypasses the anti-reverse connection diode, namely not pass through the anti-reverse connection diode. However, when the energy storage module is reversely connected with the power supply module, the current flows through the anti-reverse connection diode, resulting in that the fuse is blown due to the high current, thereby effectively avoiding the damage to other components on the circuit.

According to the present disclosure, the predetermined time may be in a range between 10 ms and 1,000 ms. Within this time range, the slave MCU module can quickly identify the real-time working state of the light fixture, and promptly retract the light-emitting lens into the light fixture, thereby achieving the function that the light-emitting lens may automatically retract when the light fixture is powered off.

The light fixture in the present disclosure may further include a light source formed by a plurality of light-emitting components. The light-emitting lens is controlled by the slave MCU module to extend out of or retract into the light fixture in a direction away from or towards the light source, during which the dimensions and imaging sharpness of the light spots projected by the light fixture also change accordingly, thereby forming diverse and dynamic stage lighting effects.

A method for automatically retracting a lens of a light fixture is further provided according to the present disclosure, including:

providing a slave MCU module to communicatively connect to a master MCU module and a driving module, wherein the master MCU module is configured to generate a signal based on an instruction and transmit the signal to the slave MCU module, the driving module is configured to control a motor to drive a light-emitting lens of the light fixture to extend out of or retract into the light fixture based on the signal received by the slave MCU module, and wherein the master MCU module, the slave MCU module, and the driving module are electrically connected to a power supply module, respectively, for power supply during normal operation of the light fixture;

providing an energy storage module to electrically connect to the power supply module, the slave MCU module, and the driving module, the energy storage module being charged by the power supply module, wherein the slave MCU module and the driving module are power supplied by the energy storage module in response to the power supply module being inactivated;

determining by the slave MCU module whether the signal form the master MCU module has been received within a predetermined time; and in response to determining that the signal form the master MCU module has not been received by the slave MCU module within the predetermined time, determining by the slave MCU module that the power supply module is inactivated, and controlling the driving module to drive the motor to retract the light-emitting lens into the light fixture.

Preferably, the method further may include providing an anti-reverse module between the power supply module and the energy storage module. The anti-reverse module can prevent the energy storage module from supplying power to the master MCU module and the power supply module when the power supply module is inactivated, so that the master MCU module can be prevented from sending a false signal because of receiving electric energy from the energy storage module, which effectively ensures determination accuracy of the slave MCU module. Such configuration can also effectively save electric energy.

Reference signs:110 master MCU module; 120 slave MCU module; 130 driving module; 140 motor; 150 power supply module; 160 light-emitting lens; 170 energy storage module; 180 anti-reverse module; 190 RS485 bus module; 191 RS485 interface chip; R receiving pin; T output pin; RE receiving enable pin; DE driving enable pin; EN MCU enable pin; VDD power supply positive pin; A differential positive terminal pin; B differential negative terminal pin; D1 anti-reverse connection diode; R1 pull-up resistor; R2 pull-down resistor; C1 energy storage capacitor; R3 energy-consuming resistor; R4 anti-surge resistor; 200 light head; 210 light outlet; 300 support arm; 400 base.

DETAILED DESCRIPTION OF THE EMBODIMENTS

The accompanying drawings are for illustrative purposes only and should not be construed as limiting this disclosure. In order to better illustrate this embodiment, some components in the accompanying drawings may be omitted, enlarged, or reduced is size, and does not reflect the actual dimension of the product. For those having ordinary skill in the art, it is understandable that some well-known structures and their explanations may be omitted in the accompanying drawings. The description of the positional relationship in the accompanying drawings is for illustrative purposes only and should not be construed as limiting this disclosure.

Figure 1:
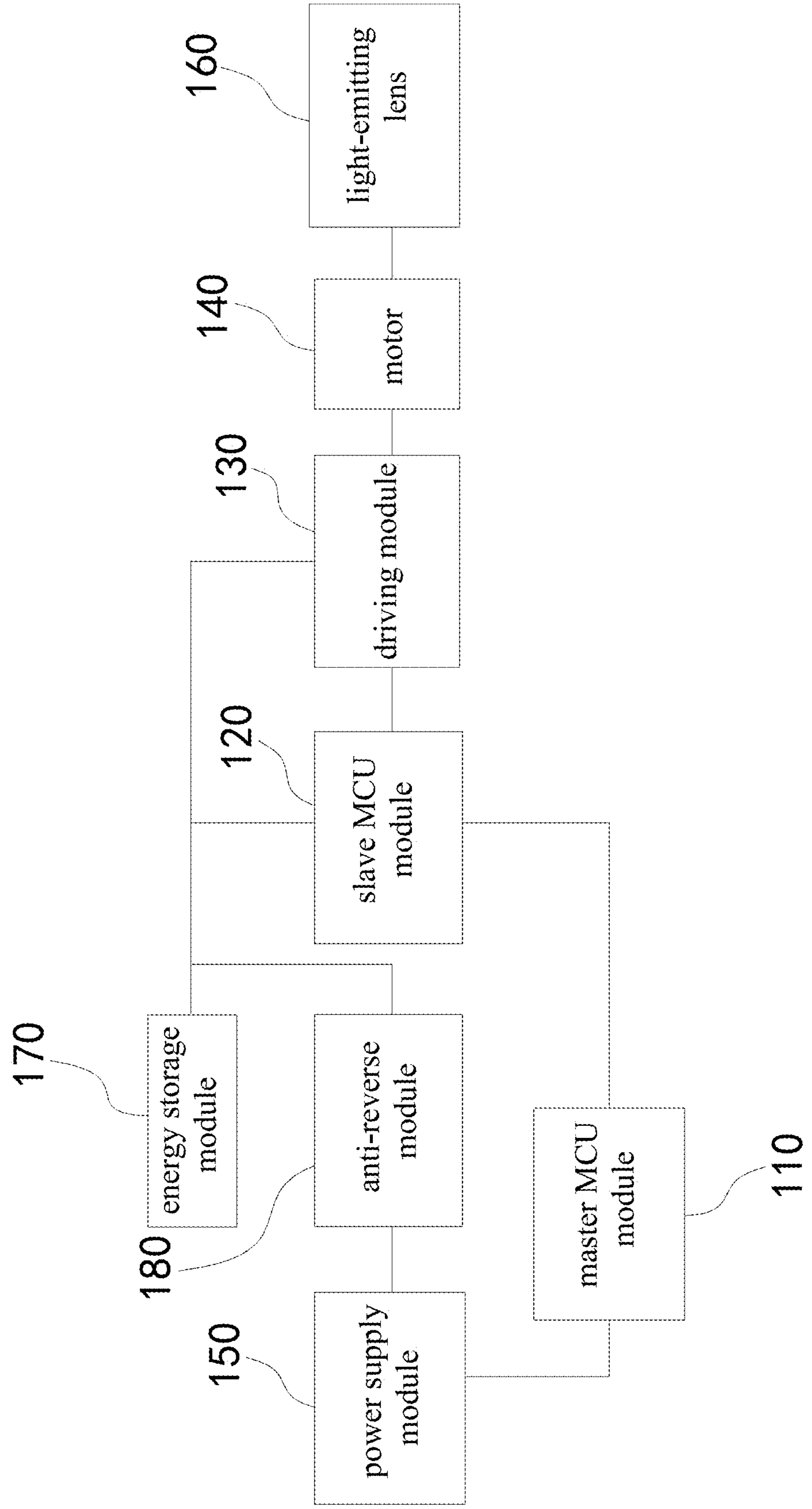
FIG. 1 is a schematic structural diagram of a principle of s light fixture according to an embodiment of the present disclosure.
Figure 4:
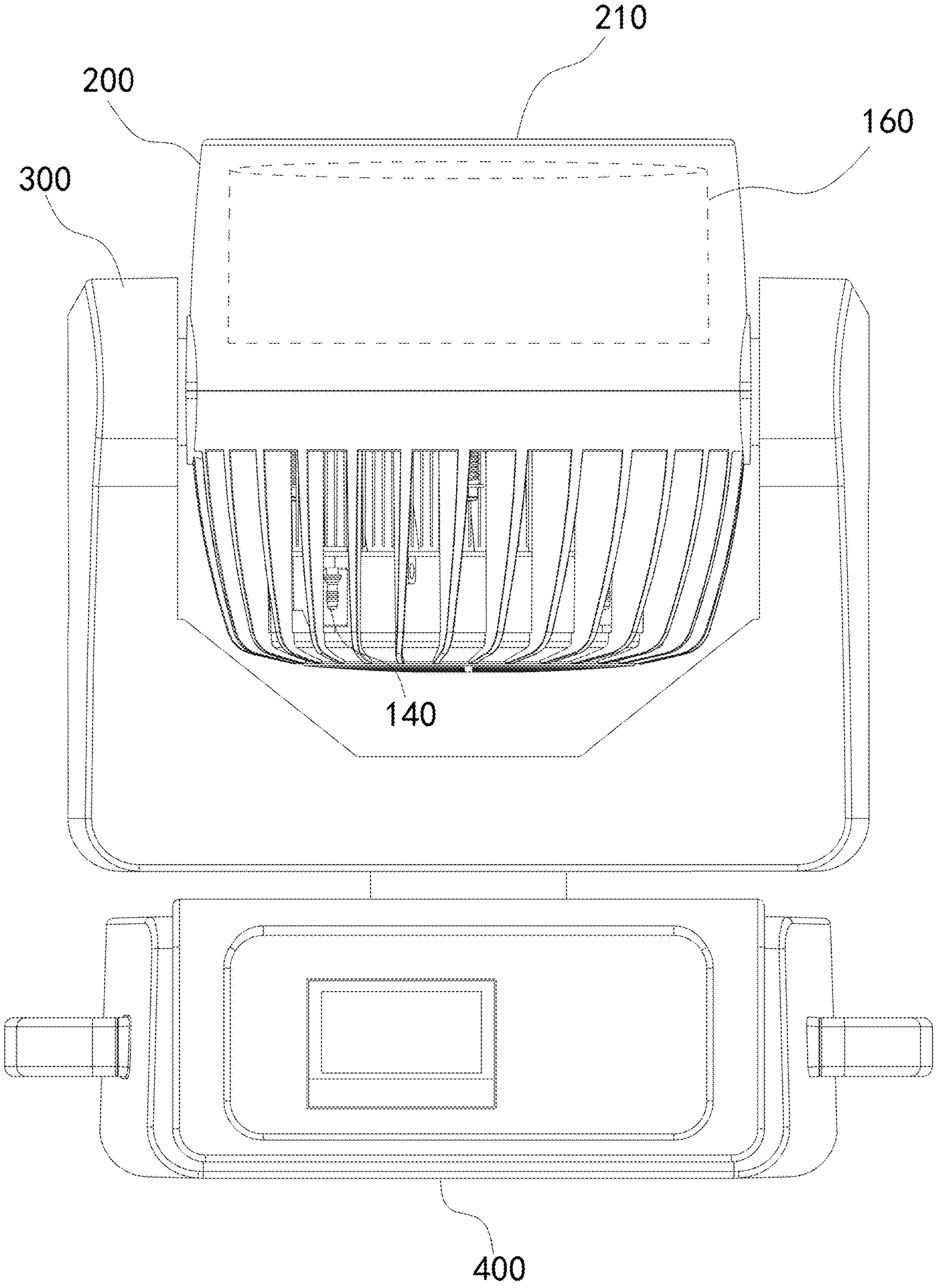
FIG. 4 is a schematic structural diagram showing a light-emitting lens retracting into the light fixture of the present disclosure.
Figure 5:
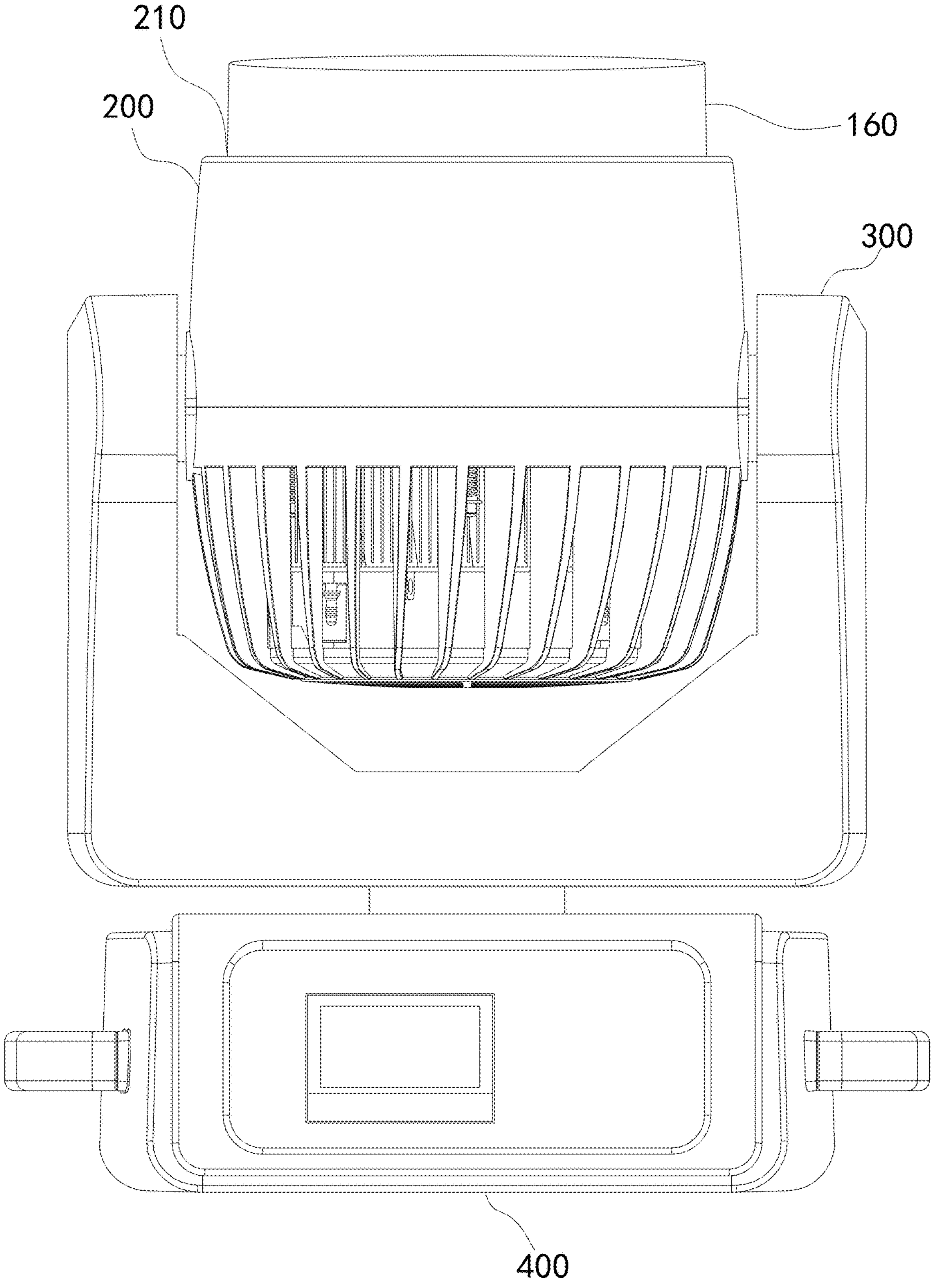
FIG. 5 is a schematic structural diagram showing the light-emitting lens extending out of the light fixture of the present disclosure.

Referring to FIG. 1, FIG. 4 and FIG. 5, a light fixture with automatic lens retraction based on signal monitoring of a master controller according to an embodiment of the present disclosure includes a master MCU module 110, a slave MCU module 120 in communication connection with the master MCU module 110, a driving module 130 controlled by the slave MCU module 120, a motor 140 driven by the driving module 130, and a power supply module 150 supplying power to the master MCU module 110, the slave MCU module 120 and the driving module 130. The motor 140 is configured to drive a light-emitting lens 160 of the light fixture to extend out of or retract into the light fixture. The master MCU module 110 is configured to indirectly control the driving module 130 through the slave MCU module 120 when the light fixture is in normal operation. An energy storage module 170 is further included for supplying power to the slave MCU module 120 in a case that the power supply module 50 is inactivated. In this embodiment, the slave MCU module 120 is configured to control the motor 140 to drive the light-emitting lens 160 to retract into the light fixture, when the slave MCU module 120 has awaited a signal from the master MCU module 110 for more than a predetermined time. The energy storage module 170 is charged by the power supply module 150.

According to the present embodiment, when the light fixture is powered on for normally operating, the power supply module 150 simultaneously supplies power to the master MCU module 110, the slave MCU module 120 and the driving module 130. The master MCU module 110 forwards a control signal through the slave MCU module 120 to indirectly control the driving module 130 when the light fixture is in normal operation, so that the motor 140 drives the light-emitting lens 160 to extend out of or retract into the light fixture according to an instruction for generating the control signal. The master MCU module 110 also periodically sends a signal indicating its own power-on state to the slave MCU module 120. When the power supply module 150 is inactivated, the master MCU module 110 stops working, and the slave MCU module 120 is powered by the energy storage module 170. As this case, if the slave MCU module 120 does not receive the signal from the master MCU module 110 within a predetermined time, it is determined that the light fixture is powered off, and the motor 140 is immediately controlled by the driving module 130 to retract the light-emitting lens 160 into the inside of the light fixture. In this embodiment, the master MCU module 110 and the slave MCU module 120 work collaboratively through communication connection, enabling sensitive detection of a real working state of the light fixture, and quickly triggering a protection action on the light-emitting lens 160. This avoids damage to the light-emitting lens 160 caused by exposure during transportation. The light fixtures on the market usually choose to be powered by a battery or an alternating current, however, the present embodiment eliminates the need to replace a module based on power types for detecting the power-on state of the light fixture, which thus is a simpler and more reliable way with compatibility.

As shown in FIGS. 4 and 5 the light fixture further includes a base 400, a support arm 300 pivotally connected to the base 400, and a light head 200 pivotally connected to the support arm 300, especially an inner side of the support arm 300. A light source for generating light beams is mounted at one end of the light head 200, and a light outlet 210 is formed in the end distal from the light source. Driven by the motor 140, the light-emitting lens 160 can extend out of or retract into the light outlet 210. When the light fixture is inactivated, the light-emitting lens 160 is controlled by the slave MCU module 120 to retract into the light fixture through the light outlet 210, thereby effectively ensuring safety of the light-emitting lens during transportation.

The motor 140 is preferably a screw motor. Two or three motors are selected, depending on the design requirements, which ensures more uniform stress distribution on the light-emitting lens 160 during extension and retraction.

Additionally or alternatively, a sliding rail, a sliding block and a guide column may also be arranged in the light fixture to guide the movement of the light-emitting lens 160. In this case, the light-emitting lens 160 is fixedly connected with the sliding block, and the motor 140 is a stepping motor.

The power supply module 150 is preferably a switching power supply connected to the mains electricity. When the light fixture is operating normally, the power supply module 150 is powered by the mains electricity, allowing for long-term operation. The switching power supply converts the mains electricity into a constant-voltage direct current and supply to the light fixture.

Preferably, the master MCU module 110 and the slave MCU module 120 CAN may be in communication connection through the CAN protocol, RS485 protocol or other protocols capable of stable signal transmission.

As shown in FIG. 1, in a preferred embodiment of the present disclosure, an anti-reverse module 18 is further provided between the power supply module 150 and the energy storage module 170, especially the power supply module 150 is electrically connected with the energy storage module 170, the slave MCU module 120 and the driving module 130 through the anti-reverse module 18. The anti-reverse module 180 may prevent the energy storage module 170 from reversely supplying power to the power supply module 150 and the master MCU module 110, when the power supply module 150 is inactivated, thereby effectively saving electric energy. The anti-reverse module 180 can also prevent the master MCU module 110 from sending a false signal because of electric energy supply from the energy storage module 170, which effectively ensures the determination accuracy of the slave MCU module 120.

The anti-reverse module 180 is preferably a diode module. With the characteristic of unidirectional conduction, the diode module may effectively block a reverse current. The diode module has a simple structure, and is suitable for most circuit structures.

However, in other embodiments of the present disclosure, the anti-reverse module may be selected as an MOS transistor.

In a preferred embodiment of the present disclosure, the master MCU module 110 and the slave MCU module 120 are in communication connection through a CAN bus module. The communication connection constructed by the CAN bus module offers excellent real-time performance, reliability and expansibility, making it especially suitable for a smart lighting control system requiring high reliability and multi-node coordination.

Figure 2:
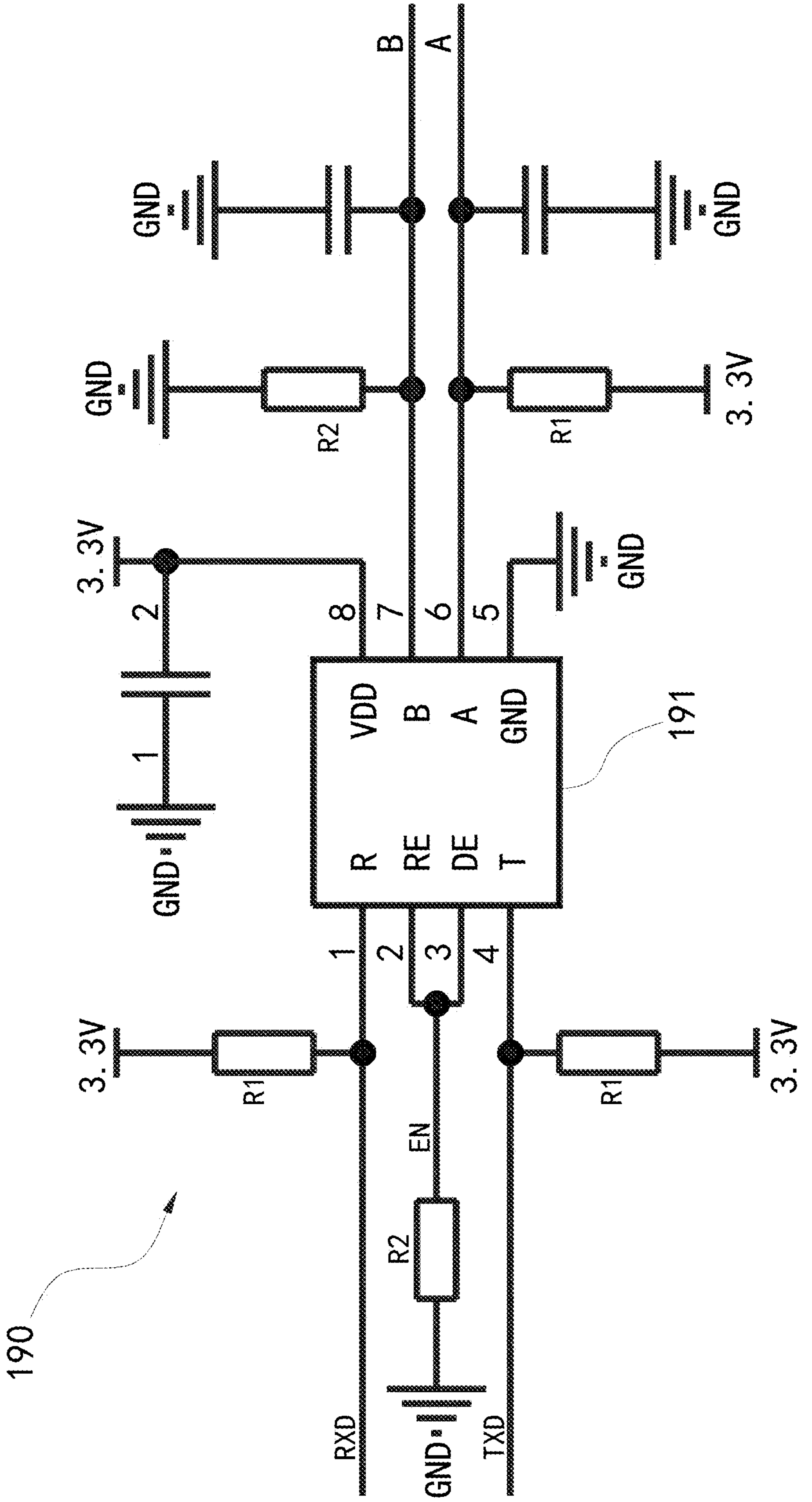
FIG. 2 is a schematic circuit diagram of an RS485 interface chip according to an embodiment of the present disclosure.

In combination with FIG. 1 and FIG. 2, in a preferred embodiment of the present disclosure, the master MCU module 110 and the slave MCU module 120 are in communication connection through an RS485 bus module 190. The RS485 bus module 190 can convert a serial signal sent by the master MCU module 110 into a differential signal for transmission. This transmission mode provides strong good anti-interference capability, which is more suitable for the light fixture with complex electromagnetic environment.

FIG. 2 shows a circuit of the RS485 bus module 190 according to an embodiment of the present disclosure. The RS485 bus module 190 in this embodiment includes two RS485 interface chips 191. The master MCU module 110 is connected with a receiving pin R, an output pin T and an enable pin of one of the two RS485 interface chips 191, the slave MCU module 120 is connected to a receiving pin R, an output pin T and an enable pin of the other RS485 interface chip 191, and the two RS485 interface chips 191 are connected to each other through respective differential positive terminal pins A and differential negative terminal pins B correspondingly. In such way, the serial signal sent by the master MCU module 110 is converted into the differential signal for transmission, and then is finally converted into the serial signal and transmitted to the slave MCU module 120. In the process of signal transmission, the differential signal is more stable than the serial signal.

Particularly, a signal sending terminal of the master MCU module 110 is connected to the receiving pin R of one of the RS485 interface chips 191, and a signal receiving terminal of the master MCU module 110 is connected to the output pin T of the RS485 interface chip 191. The receiving pin R and the output pin T are respectively connected to a 3.3V voltage source via a pull-up resistor R1. A receiving enable pin RE and a driving enable pin DE of the RS485 interface chip 191 are connected to form the enable pin of the RS485 interface chip 191. The enable pin of the RS485 interface chip 191 is connected to an MCU enable pin EN of the master MCU module 110. In addition, the enable pin of the RS485 interface chip 191 is grounded via a pull-down resistor R2. A power supply positive pin VDD of the RS485 interface chip 191 is connected to the 3.3V voltage source. The other RS485 interface chip 191 is connected in a similar way to the slave MCU module 120. The differential positive terminal pins A and differential negative terminal pins B of the two RS485 interface chips 191 are connected correspondingly. In this way, the serial signal sent by the master MCU module 110 is converted into the differential signal by the RS485 interface chip 191 and transmitted to the other RS485 interface chip 191, then converted into the serial signal and transmitted to the slave MCU module 120 to complete communication.

Preferably, the differential positive terminal pin A is connected to a 3.3V voltage source via a pull-up resistor R1, and the differential negative terminal pin B is grounded via a pull-down resistor R2.

Figure 3:
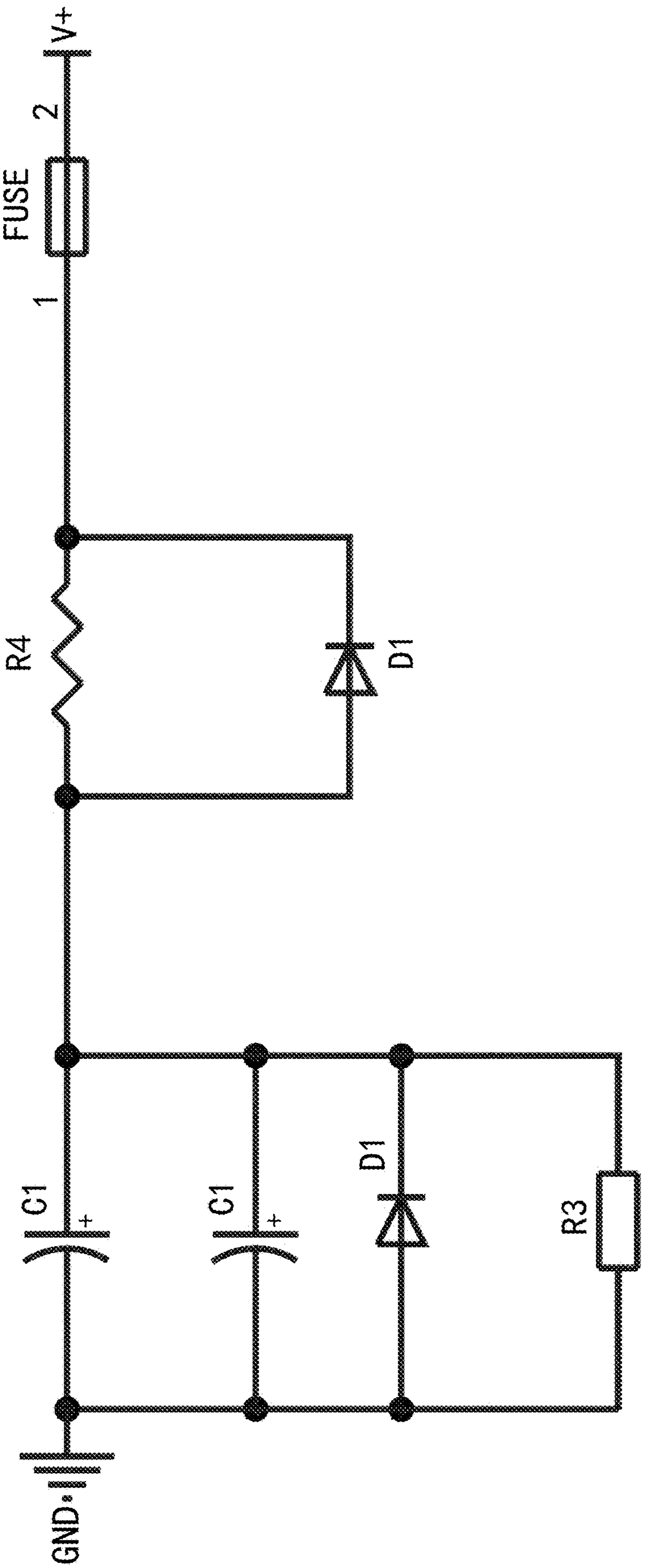
FIG. 3 is a schematic circuit diagram of an energy storage module according to an embodiment of the present disclosure.

In combination with FIG. 1 and FIG. 3, in a preferred embodiment of the present disclosure, the energy storage module 170 includes at least one energy storage capacitor C1 for storing energy. The energy storage capacitor C1 enables temporary energy storage, offering significant advantages in response speed, space occupation and system reliability compared to battery, as well as being safer.

More preferably, the energy storage module 170 includes two energy storage capacitors C1 arranged in parallel to increase its energy storage capacity.

In other embodiments of the present disclosure, the energy storage module 170 may use a rechargeable battery in place of the energy storage capacitor C1.

In a preferred embodiment of the present disclosure, the energy storage capacitor C1 is connected in parallel with at least one energy-consuming resistor R3. In such configuration, after the light-emitting lens 160 is successfully retracted into the light fixture, the energy-consuming resistor R3 may consume redundant electric energy in the energy storage capacitor C1.

In a preferred embodiment of the present disclosure, an anti-surge resistor R4 is further included. In this embodiment, the current of the power supply module 150 entering the energy storage module 170 is finally grounded after passing through the anti-surge resistor R4 and the energy storage capacitor C1 in sequence. The anti-surge resistor R4 is provided to limit a transient high current or voltage spike in the circuit to achieve a "soft start" of the circuit. This prevents a charging current to the energy storage module 170 from instantly reaching the current limit of the power module 150 at startup, thereby reducing the current stress on the charging circuit.

In a preferred embodiment of the present disclosure, a FUSE is further arranged between the power supply module 150 and the anti-surge resistor R4. The anti-surge resistor R4 and/or the energy storage capacitor C1 are connected in parallel with an anti-reverse connection diode D1 to prevent a reverse connection between the energy storage module 170 and the power supply module 150. In such configuration, when the connecting between the power supply module 150 and the anti-surge resistor R4 is correct, the current does not flow through the anti-reverse connection diode D1. However, when the energy storage module 170 is reversely connected with the power supply module 150, namely the connecting between the power supply module 150 and the anti-surge resistor R4 is incorrect, the current flows through the anti-reverse connection diode D1, resulting that the FUSE is blown due to the high current, thereby effectively avoiding the damage to other components in the circuit.

More preferably, as shown in FIG. 3, both the anti-surge resistor R4 and the energy storage capacitor C1 are connected in parallel with the anti-reverse connection diode D1 to prevent the reverse connection between the energy storage module 170 and the power supply module 150.

Preferably, the anti-surge resistor R4 is a thermistor.

In a preferred embodiment of the present disclosure, the predetermined time is between 10 ms and 1,000 ms. Within this time range, the slave MCU module 120 can quickly identify the real-time working state of the light fixture, and thus promptly retract the light-emitting lens 160 into the light fixture, thereby achieving that the light-emitting lens 160 can be automatically retracted when the light fixture is powered off.

More preferably, the predetermined time is 20 ms.

The light source may be formed by a plurality of light-emitting components. The light-emitting lens 160 is controlled by the slave MCU module to extend or retract in a direction away from or towards the light source, during which the dimensions and imaging sharpness of the light spots projected by the light fixture change accordingly, thus forming diverse and dynamic stage lighting effects.

Optionally, the light source is a high-power LED module.

Obviously, the above-mentioned embodiments of the present disclosure are only examples for clearly explaining the technical solutions of the present disclosure, and are not intended to limit the specific implementations of the present disclosure. For those having ordinary skill in the art, other variations or modifications in different forms can be made on the basis of the above description. It is not necessary or impossible to exhaustively list all the implementations here. Any modifications, equivalent substitutions and improvements made within the spirit and principle of the claims of the present disclosure should be included in the protection scope of the claims of the present disclosure.

What is claimed is:

1. A light fixture with automatic lens retraction based on signal monitoring of a master controller, comprising:

a master MCU (Microcontroller Unit) module;

a slave MCU module in communication connection with the master MCU module;

a driving module, which is controlled by the slave MCU module;

a motor controlled by the driving module, which is configured to drive a light-emitting lens of the light fixture to extend out of or retract into the light fixture;

a power supply module, which is electrically connected to the master MCU module, the slave MCU module and the driving module for power supply during normal operation of the light fixture; and an energy storage module, which is configured to supply power to the slave MCU module when the power supply module is inactivated, the energy storage module being charged by the power supply module, wherein the slave MCU module is further configured to determine that the power supply module is inactivated and control the motor to drive the light-emitting lens to retract into the light fixture, in response to the slave MCU module not receiving a signal from the master MCU module within a predetermined time.

2. The light fixture according to claim 1, wherein an anti-reverse module is provided between the power supply module and the energy storage module.

3. The light fixture according to claim 2, wherein the anti-reverse module is a diode module.

4. The light fixture according to claim 1, wherein the master MCU module and the slave MCU module are in communication connection via a CAN bus module.

5. The light fixture according to claim 1, wherein the master MCU module and the slave MCU module are in communication connection via an RS485 bus module.

6. The light fixture according to claim 5, wherein the RS485 bus module comprises two RS485 interface chips, the master MCU module is connected with a receiving pin, an output pin, and an enable pin of one of the RS485 interface chips, the slave MCU module is connected to a receiving pin, an output pin, and an enable pin of the other RS485 interface chip, and the two RS485 interface chips are correspondingly connected through respective differential positive terminal pins and differential negative terminal pins.

7. The light fixture according to claim 1, wherein the energy storage module comprises at least one energy storage capacitor for storing energy.

8. The light fixture according to claim 7, wherein the energy storage capacitor is connected in parallel with at least one energy consuming resistor.

9. The light fixture according to claim 7, wherein the energy storage module comprises an anti-surge resistor, and a current of the power supply module entering the energy storage module is grounded after sequentially passing through the anti-surge resistor and the energy storage capacitor.

10. The light fixture according to claim 9, the energy storage module further comprises a fuse arranged between the power supply module and the anti-surge resistor, and wherein at least one of the anti-surge resistor and the energy storage capacitor is connected in parallel with an anti-reverse connection diode to prevent a reverse connection between the energy storage module and the power supply module.

11. The light fixture according to claim 1, wherein the predetermined time is between 10 ms and 1,000 ms.

12. The light fixture according to claim 1, wherein a light source of the light fixture is formed by a plurality of light-emitting components, and the light-emitting lens is controlled by the slave MCU module to extend out of or retract into the light fixture in a direction away from or towards the light source.

13. A method for automatically retracting a lens of a light fixture, comprising:

providing a slave MCU module to communicatively connect to a master MCU module and a driving module, wherein the master MCU module is configured to generate a signal based on an instruction and transmit the signal to the slave MCU module, the driving module is configured to control a motor to drive a light-emitting lens of the light fixture to extend out of or retract into the light fixture based on the signal received by the slave MCU module, and wherein the master MCU module, the slave MCU module, and the driving module are electrically connected to a power supply module, respectively, for power supply during normal operation of the light fixture;

providing an energy storage module to electrically connect to the power supply module, the slave MCU module, and the driving module, the energy storage module being charged by the power supply module, wherein the slave MCU module and the driving module are power supplied by the energy storage module in response to the power supply module being inactivated;

determining by the slave MCU module whether the signal form the master MCU module has been received within a predetermined time; and in response to determining that the signal form the master MCU module has not been received by the slave MCU module within the predetermined time, determining by the slave MCU module that the power supply module is inactivated, and controlling the driving module to drive the motor to retract the light-emitting lens into the light fixture.

14. The method according to claim 13, further comprising: providing an anti-reverse module between the power supply module and the energy storage module.

15. The method according to claim 14, wherein the anti-reverse module is a diode module.

16. The method according to claim 13, wherein the master MCU module and the slave MCU module are in communication connection via a CAN bus module.

17. The method according to claim 13, wherein the master MCU module and the slave MCU module are in communication connection via an RS485 bus module.

18. The method according to claim 13, wherein the energy storage module comprises at least one energy storage capacitor for storing energy.

19. The method according to claim 18, wherein the energy storage module comprises an anti-surge resistor, and a current of the power supply module entering the energy storage module is grounded after sequentially passing through the anti-surge resistor and the energy storage capacitor.

20. The method according to claim 13, wherein the predetermined time is between 10 ms and 1,000 ms.

* * * * *